(No Model.)

F. M. ARCHER.
ELECTRIC BATTERY.

No. 495,176. Patented Apr. 11, 1893.

Witnesses
C. R. Ferguson
Jno. A. Pollock

Inventor
Frank M. Archer
By his Attorney
Edwin H. Brown

UNITED STATES PATENT OFFICE.

FRANK M. ARCHER, OF NEW YORK, N. Y., ASSIGNOR, BY MESNE ASSIGNMENTS, TO THE HERO ELECTRIC COMPANY, OF JERSEY CITY, NEW JERSEY.

ELECTRIC BATTERY.

SPECIFICATION forming part of Letters Patent No. 495,176, dated April 11, 1893.

Application filed November 25, 1891. Serial No. 413,138. (No model.)

*To all whom it may concern:*

Be it known that I, FRANK M. ARCHER, of New York, in the county and State of New York, have invented a certain new and useful Improvement in Electric Batteries, of which the following is a specification.

I will describe an electric battery embodying my improvement and then point out the novel features in a claim.

Figure 1:
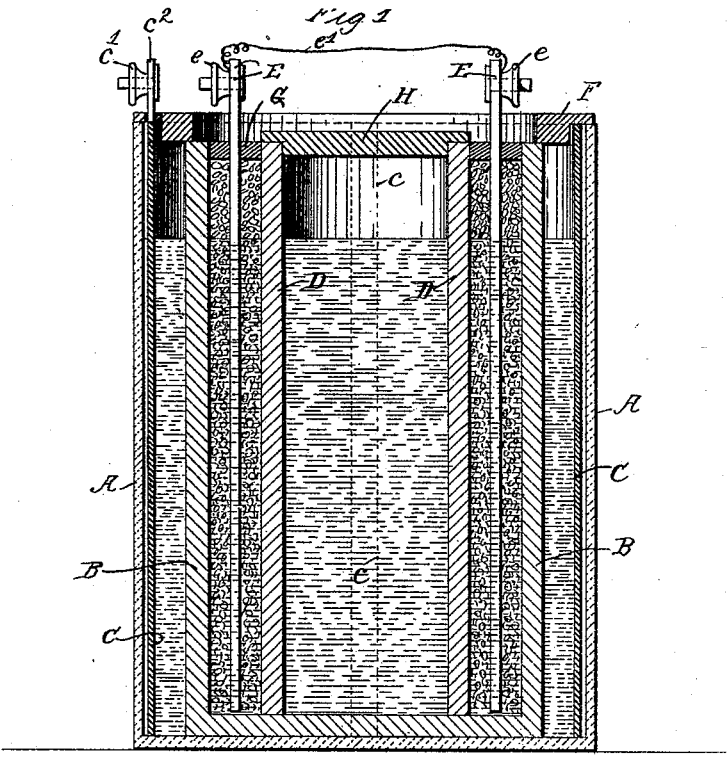
Figure 2:
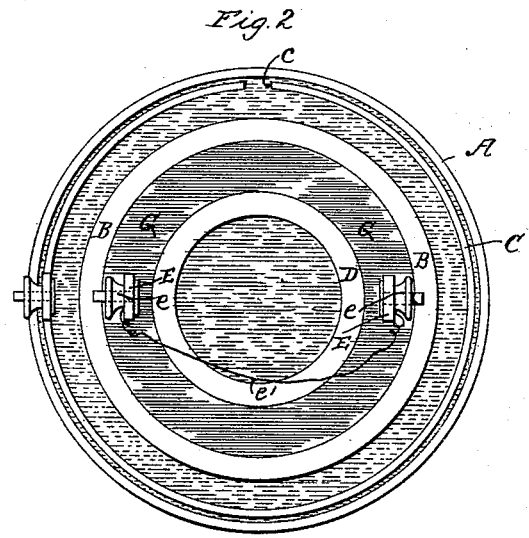

In the accompanying drawings, Figure 1 is a central vertical section of an electric battery embodying my improvement. Fig. 2 is a top view of the same with the cover removed.

Similar letters of reference designate corresponding parts in both figures.

A designates a cell which may be made of glass or other material and, as here shown, is of cylindric form. Within it is arranged a porous cup B, which is so much smaller in diameter that an annular space of considerable size is left between it and the wall of the cell. As here shown, this porous cup rests upon the bottom of the cell.

In the space between the porous cup B and cell A a zinc element C is arranged. As here shown, this zinc element is of cylindric form and may be nearly as large as the interior of the cell A. It will advantageously have an opening permitting the passage of liquid from one side to the other. A vertical slot $c$ will be a suitable opening for this purpose. A tang or rod $c'$ extending upwardly from the zinc element and provided with a binding screw $c^2$ affords provision for the attachment of a circuit wire.

Within the porous cup B is arranged a shell D. This shell, as well as the cup B, may be made of the material ordinarily employed for the porous cups of batteries. This shell does not require any bottom. Its lower edge may rest directly upon the bottom of the porous cup. The space between the wall of the porous cup B and the shell D contains pieces of carbon or manganese in suitable proportions, say, for example, seven parts of carbon to one of manganese.

In the space between the wall of the cup B and the shell D, rods E, preferably made of carbon, are arranged. At their upper ends are binding screws $e$. A wire $e'$ fastened to these binding screws will be preferably used to connect the rods E. The binding screw of one of the rods also serves as a connection for a circuit wire.

A cover, F, made of any suitable material, as for example, an annular piece of wood saturated with paraffine or other wax, extends over the space between the walls of the cell A and porous cup B. It may be arranged to extend into the space and rest upon the top of the zinc element. It is intended to fit closely and form a tight joint.

A cover, G, extends over the space between the wall of the porous cup B and shell D. This cover may advantageously consist of paper or like material filling the upper part of said space and melted paraffine or other wax covering the paper, so as to make a tight joint. This cover must, of course, be made so tight as to permit of the passage of the rods E. The wax will of course make the tight joint.

A cover, H, made of a disk of any suitable material such as wood saturated with paraffine or other wax extends over the shell D. It is shown as having a central portion extending down into the shell and a flangelike portion resting upon the top of the shell.

While I do not wish to be confined to the solutions used in this battery, I may say that a solution of sulphuric acid and water may be used in the cell A, outside of the porous cup and a solution or bichromate of soda, sulphuric acid, nitric acid and water may be used within the porous cup B and also within the shell D.

By my improvement I produce a battery very cheap in construction, economical in use, giving a high voltage as well as a high amprage and a battery, withal, which will polarize very slowly.

My improvement enables me to use a very strong fluid, where it will come in contact with the least destructible parts of the battery, namely, within the porous cup B and the shell D, and a relatively weak solution in contact with the zinc element. Moreover, I obtain a large extent of carbon surface in a very cheap way.

What I claim as my invention, and desire to secure by Letters Patent, is—

In a battery the combination of a cell, a zinc element arranged close to and conforming to the inner wall of the cell, a porous cup within the zinc element and having a space between them, a porous shell or diaphragm within the porous cup, pieces of carbon between the porous cup and shell or diaphragm and carbon rods extending into the carbon pieces and extending through the top of the cell substantially as specified.

In testimony whereof I have signed my name to this specification in the presence of two subscribing witnesses.

FRANK M. ARCHER.

Witnesses:
WM. A. POLLOCK,
C. R. FERGUSON.